Jan. 16, 1934.  T. W. POSEY  1,943,343
LICENSE PLATE
Filed Feb. 24, 1933

Inventor
T. W. Posey,

By Clarence A. O'Brien
Attorney

Patented Jan. 16, 1934

1,943,343

UNITED STATES PATENT OFFICE 1,943,343

LICENSE PLATE

Thomas Wynn Posey, Brownwood, Tex., assignor of one-fourth to Sterling Clark Holloway Application February 24, 1933. Serial No. 658,411

1 Claim. (Cl. 40—125)

This invention relates to a license plate for automobiles and the like, the general object of the invention being to provide a plate with reinforced edges and reinforced eyelets for receiving the fastening means which connect the plate to a part of the automobile.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

As shown in these views, the plate A has its edges turned over rearwardly, as shown at 1, and a wire 2 passes through the spaces formed by these overturned edges so that the plate is reinforced both by the turned-over edges and the wire over which the edges are turned. The wire is bent to form the closed loops 3 which register with the slots 4 in the top part of the plate and which are designed to receive the fastening means which fasten the plate to a part of the motor vehicle or the like.

Figure 1:
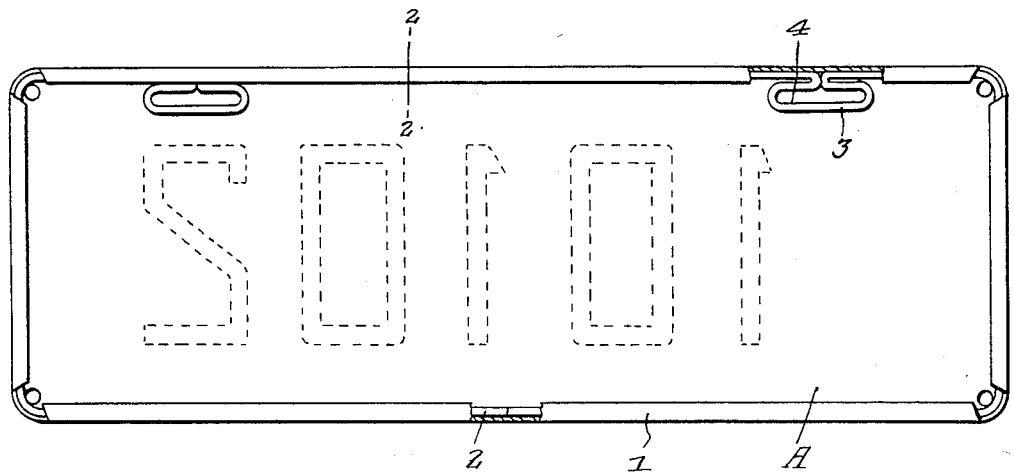
Figure 1 is a rear view of the improved plate, with parts broken away.
Figure 2:
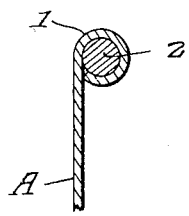
Figure 2 is a section on line 2—2 of Figure 1.

As shown in Figure 1, the wire 2 is composed of but a single piece, with its ends meeting at the lower edge of the plate at the center thereof, with the two loops 3 in the top part of the wire for registering with the slots 4.

Thus I have not only provided a reinforced plate, but one which has the slots or openings for receiving the fastening means also reinforced.

This formation of a license plate also eliminates the sharp edges of plates as now constructed, which are apt to cause injury to one handling the plate and mechanics working on a car near the plates.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A plate of the class described having a reinforcing wire extending around the edges of the plate at the rear thereof, with said edges bent over the wire, said plate having openings therein for receiving fastening means and portions of the wire being bent to form loops, the openings of which register with the openings in the plate.

THOMAS WYNN POSEY.